United States Patent [19]

Weinstein

[11] E Re. 31,253

[45] Reissued May 24, 1983

[54] ECHO CANCELLATION IN TWO-WIRE, TWO-WAY DATA TRANSMISSION SYSTEMS

[75] Inventor: Stephen B. Weinstein, Holmdel, N.J.

[73] Assignee: Bell Telephone Laboratories, Incorporated, Murray Hill, N.J.

[21] Appl. No.: 220,191

[22] Filed: Dec. 23, 1980

Related U.S. Patent Documents

Reissue of:

[64] Patent No.: 4,131,767
Issued: Dec. 26, 1978
Appl. No.: 880,293
Filed: Feb. 22, 1978

U.S. Applications:

[63] Continuation-in-part of Ser. No. 721,032, Sep. 7, 1976, abandoned.

[51] Int. Cl.[3] ..... H04B 3/20

[52] U.S. Cl. ..... 179/170.2; 370/24

[58] Field of Search ..... 179/170.2, 170.6, 170.8; 370/24; 375/8

[56] References Cited

U.S. PATENT DOCUMENTS

| | | | |
|---|---|---|---|
| 3,499,999 | 3/1970 | Sondhi | 179/170.2 |
| 3,500,000 | 3/1970 | Kelly et al. | 179/170.2 |
| 3,597,541 | 8/1971 | Proakis et al. | 179/170.2 |
| 3,732,410 | 5/1973 | Mackechnie | 179/170.2 |
| 3,735,055 | 5/1973 | Thomas | 179/170.2 |
| 3,810,021 | 5/1974 | Kalet et al. | 325/141 |
| 3,922,505 | 11/1975 | Höge | 179/170.2 |
| 4,007,341 | 2/1977 | Sourgens et al. | 179/170.2 |
| 4,087,654 | 5/1978 | Mueller | 179/170.2 |

OTHER PUBLICATIONS

V. Koll and S. Weinstein; "Simultaneous Two-Way Data Transmission over a Two-Wire Circuit"; IEEE Transactions on Communications; Feb. 1973; pp. 143-147.

M. Sondhi; "An Adaptive Echo Canceller"; Bell System Technical Journal; vol. XLVI, No. 3; Mar. 1967; pp. 497-511.

F. Becker and H. Rudin; "Application of Automatic Transversal Filters to the Problem of Echo Suppression"; Bell System Tech. Journal; Dec. 1966; pp. 1847-1850.

K. Mueller; "A New Digital Echo Canceller for Two--Wire Full-Duplex Data Transmission"; IEEE Trans. on Communications; vol. COM-24, No. 9; Sep. 1976; pp. 956-962.

*Primary Examiner*—G. Z. Rubinson
*Assistant Examiner*—Randall P. Myers
*Attorney, Agent, or Firm*—Ronald D. Slusky

[57] ABSTRACT

An adaptive echo canceller for two-wire, simultaneous two-way data communication at full bandwidth uses Nyquist-interval, rather than baud-interval, processing to achieve independence from timing discrepancies between near-end and far-end terminals. The entire echo signal, and not merely baud-interval samples thereof, is suppressed. The echo canceller is preferably a transversal structure.

29 Claims, 5 Drawing Figures

34 OR 54
ONE BAUD INTERVAL T
Δ=NYQUIST INTERVAL
DELAY UNITS 80
FROM POINT 32 [$a_n$] (FIG. 2) OR POINT 52 (FIG. 3)
DELAY
βX(ERROR)
TAP MULTIPLIER
TAP-GAIN CONTROL 87
Σ
90 ECHO CANCELLATION SIGNAL
TO COMBINER 36 (FIG. 2) DIRECTLY OR AFTER UP-MODULATION TO COMBINER 56 (FIG. 3)
FROM LEAD 38 (FIG. 2) OR LEAD 64 (FIG. 3)
ERROR
STEP-SIZE CONTROL

ECHO CANCELLATION IN TWO-WIRE, TWO-WAY DATA TRANSMISSION SYSTEMS

Matter enclosed in heavy brackets [ ] appears in the original patent but forms no part of this reissue specification; matter printed in italics indicates the additions made by reissue.

CROSS-REFERENCE TO RELATED APPLICATION

This [application] is a *reissue of U.S. Pat. 4,131,767, issued December 26, 1978, which, in turn, is a* continuation-in-part of U.S. Pat. application Ser. No. 721,032, filed on Sept. 7, 1976 and now abandoned.

1. FIELD OF THE INVENTION

This invention relates *generally to the suppression of echoes in digital data transmission. In particular, this invention relates* to the suppression of echo and leakage energy from digital data transmitted and received through hybrid junctions in two-way telephone transmission systems.

BACKGROUND OF THE INVENTION

Much of today's high-speed data communication traffic is carried out in two directions simultaneously; that is, the traffic is full duplex. For data speeds below about 2400 bits per second the voiceband extending from approximately 300 to 3000 Hz can be divided in half to allow dedication of each half to a particular transmission direction on an equivalent four-wire transmission line. For data speeds above 2400 bits per second two physically separate two-wire lines of voice bandwidth are required. If two-way (full duplex) high-speed simultaneous communication between two points could be accomplished at full bandwidth on a single two-wire channel, significant cost savings would become possible. Furthermore, a capability for simultaneous two-way digital data communication on the public switched direct-distance dialing (DDD) network would be valuable in cases where the data customer could benefit from zero "turn-around" time. Under present practices reversing the direction of transmission on a half-duplex DDD transmission channel requires time to disable built-in echo suppressors.

Two-way data communication on a two-wire transmission channel requires suppression of the interfering locally generated signal at the receiver input of each data terminal. This is partly accomplished by the use of hybrid coupling networks at the terminals, but a residual interference results from the inevitable impedance mismatch between a fixed hybrid coupler and a variety of channel connections, and from echoes returning from distant points in the transmission channel.

Adaptive echo cancellers implemented by transversal filters have been proposed for analog facilities by, for example, J. L. Kelly, Jr., and B. F. Logan, Jr., in U.S. Pat. No. 3,500,000 issued Mar. 10, 1970. In this echo canceller a portion of the analog signal incoming to a hybrid coupling on the four-wire side is passed through a transversal filter with adjustable tap gain control to synthesize a cancellation signal for subtraction from the signal outgoing from the hybrid coupling. The resultant outgoing signal is clipped and correlated with the sequence of samples of the incoming signal appearing at the taps of the transversal filter to form control signals for the tap gains or weighting coefficients of the transversal filter.

A similar arrangement is described by F. K. Becker and H. R. Rudin in the Bell System Technical Journal (Vol. 45, 1966, pp. 1847–1850) in a paper entitled "Application of Automatic Transversal Filters to the Problem of Echo Suppression." Results achieved with a practical realization of the transversal filter as an adaptive echo canceller are reported by V. G. Koll and S. B. Weinstein in Institute of Electrical & Electronics Engineers Transactions on Communications, (Vol. COM-21, No. 2, 1973, pp. 143–147) in a paper entitled "Simultaneous Two-Way Data Transmission Over a Two-Wire Circuit."

The above-mentioned echo cancellers employing transversal structures require tap spacings no larger than the Nyquist interval which is equal to the reciprocal of twice the highest frequency present in the message signal to be transmitted, principally because the signal to be transmitted is analog in nature. In the typical voice bandwidth of 4000 Hz, eight such taps are required for each millisecond of anticipated echo delay.

In the copending U.S. patent application of K. H. Mueller (Ser. No. 636,297, filed Nov. 28, 1975), now U.S. Pat. No. 4,087,654, an echo cancelling signal is synthesized in a transversal structure having taps spaced at baud intervals, rather than at the Nyquist intervals specified in the prior art, from samples of the baseband data to be transmitted prior to modulation or application to the hybrid coupling under the control of an error signal obtained at the output of the receiver portion of a data transceiver.

In the application of D. D. Falconer and S. B. Weinstein Ser. No. 720,999, and now U.S. Pat. No. 4,074,086, [filed] *issued* Feb. 14, 1978 filed concurrently with the parent application Ser. No. 721,032 a joint echo canceller and intersymbol interference equalizer are incorporated into the receiver section of a data terminal, such that the intersymbol interference equalizer precedes the echo canceller and the adaptation of both is jointly controlled by the detected baseband output of the receiver section. By this arrangement the cancellation signal is effective only at baud or symbol intervals, as is the companion intersymbol interference equalizer, with the result that the near-end and far-end timing signals must be closely synchronized. Otherwise, elastic buffering between the cancellation signal, derived from the near-end transmitted data timing train, and the equalized received signal, whose timing is determined at the far-end terminal or by intermediate signal repeaters, must be provided. A suggested arrangement for such buffering is described in the Falconer-Weinstein application.

It is an object of this invention to provide an echo or leakage canceller in a two-way, two-wire digital data transmission system which is independent of far-end transmitter timing waves.

It is another object of this invention to provide an echo canceller in a two-way, two-wire data transmission system which suppresses echoes over the entire signal bandwidth and not merely at baud intervals.

It is a further object of this invention to provide echo cancellation in a two-way, two-wire data transmission system independently of parameters of the receiver proper.

It is yet another object of this invention to accommodate widely separated near-end and far-end echo components by inclusion of a passive bulk delay section between active echo-cancellation sections for each of such separated components.

SUMMARY OF THE INVENTION

*In accordance with this invention, the received echo-corrupted signal is sampled at at least the Nyquist rate, i.e., at a rate substantially equal to or greater than twice the frequency of the highest significant signal frequency in the received signal, and echo canceller circuitry, operating in response to the baseband data, substantially cancels the echo components of the Nyquist samples.*

In [accordance with] *an illustrative embodiment of* this invention an incoming distant data signal received through a hybrid junction from a two-wire transmission facility is sampled at a rate greater than or *substantially* equal to the Nyquist rate [, i.e., at greater than or equal to twice the frequency of the highest usable signal frequency in the received signal,] and has subtracted from it an echo or leakage cancellation signal derived from a local data source under the control of local data timing and transmitter carrier frequency, if any, to furnish an output signal substantially free of near-end and far-end echoes of the locally transmitted data and independent of far-end transmitter timing and impulse-response characteristics of the transmission facility. Simultaneous two-way, full-bandwidth data transmission over two-wire facilities is thereby made possible.

In one embodiment of this invention the transmission medium is presumed to be operating at baseband frequency levels, that is, frequencies down to zero, and therefore no modulators or demodulators are required at the data terminals.

In another embodiment the transmission medium is presumed to have a passband with finite upper and lower cutoff frequencies so that modulators and demodulators are required in the data terminals.

In both embodiments the echo cancellation signal is generated at the baseband level, but in the passband embodiment it is necessary to upmodulate the echo cancellation signal to the passband level before combining it with the received signal.

In either embodiment the error signal which controls the adaptation of the tap-gain devices in the transversal structure providing the echo cancellation signal is obtained from the output of the combiner for the received and cancellation signals and is thus obtained externally of the signal receiver proper. This arrangement differs from those of the cited copending patent applications, which derived error control signals from the detected data.

Features of this invention include:

1. The echo canceller can be used as an applique to an existing data modem in that its control signals are independent of the message being received;
2. The echo canceller is advantageously implemented by a plurally tapped transversal structure whose taps are spaced no farther apart than the Nyquist interval, that is, at no more than the reciprocal of twice the highest usable frequency of the received signal, and such that each tap is active in the cancellation filter only once during each baud interval; and
3. The adjustments of the echo canceller are independent of the parameters of the receiver proper.

BRIEF DESCRIPTION OF THE DRAWING

The objects and features of this invention will become more apparent from a consideration of the following detailed description and the drawing in which.

DESCRIPTION OF THE ILLUSTRATIVE EMBODIMENTS

Figure 1:
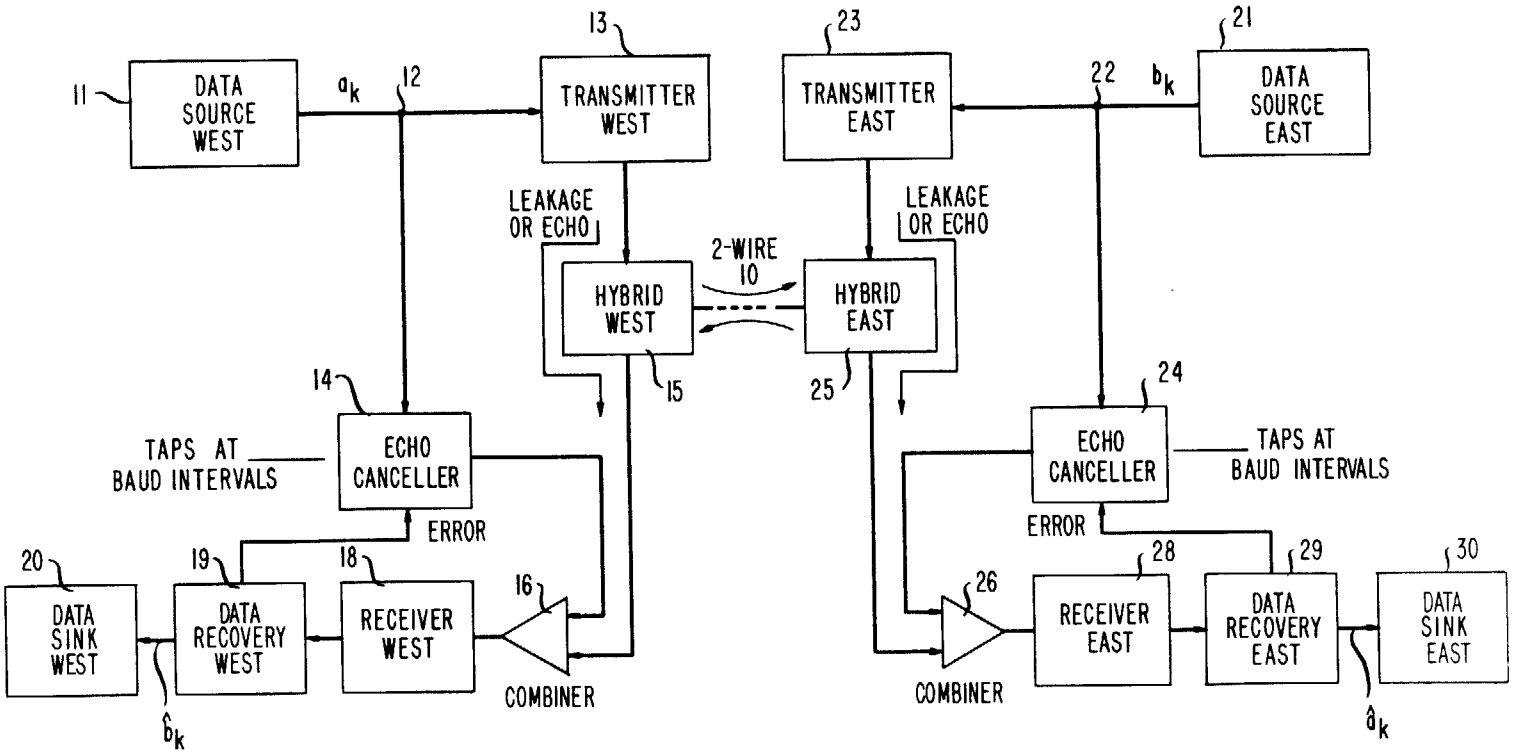
FIG. 1 (PRIOR ART)
FIG. 1 is a block diagram of a prior art two-way, two-wire full duplex digital data transmission system providing an echo cancellation feature.

FIG. 1 shows respective east and west data terminals linked together by two-wire transmission medium 10. The east terminal comprises data source east 21 providing a baseband data sequence $b_k$, transmitter east 23, hybrid east 25, differencing combiner 26, receiver east 28, data recovery east 29 for [restoring received] *determining* baseband data sequence $\hat{a}_k$, data sink east [29] *30*, and echo canceller 24. Similarly, the west terminal comprises data source west 11, providing baseband data sequence $a_k$, transmitter west 13, hybrid west 15, differencing combiner 16, receiver west 18, data recovery west 19 for [restoring received] *determining* baseband data sequence $\hat{b}_k$, data sink west 20, and echo canceller 14. In the absence of echo cancellers 14 and 24 data source west 11 can only alternate with data source east 21 in transmitting at full bandwidth data sequences $a_k$ and $b_k$, respectively, to data sink east [29] *30* and data sink west [19] *20*. The carets over the sequence [element] *elements* indicate that these are best estimates of the received data.

Data sources 11 and 21 are assumed to contain baud timing apparatus so that data are emitted synchronously at baud intervals T. The subscript k indexes these baud intervals so that all signals with a common subscript occur substantially simultaneously.

The reason that simultaneous full duplex, full bandwidth data transmission has not been practiced over two-wire facilities is principally that hybrid networks 15 and 25 can provide only compromise impedance matches to two-wire line 10, which has a different makeup from call to call and can even be time variant during calls. The imperfect match at the hybrid junctions permits significant leakage of the relatively stronger signal from the local transmitter around the hybrid junction and significantly interferes with the relatively weaker received signal.

As earlier proposed, an echo canceller responsive to the shaped or modulated transmitter output was placed directly in parallel with the leakage path around the hybrid network on the four-wire side for the purpose of generating a cancellation signal. Mueller modified this proposal by making the echo canceller responsive to baud interval samples of the baseband source data, rather than to modulated or filtered data applied to the hybrid network, and by deriving the error signal for the tap-gain coefficient adjustment from the quantized receiver output data.

FIG. 1 is a simplified diagram of the Mueller modification in which at the west terminal the baseband data sequence $a_k$ from source 11 and incident at junction 12 is applied alike to transmitter 13 for conventional shaping or modulation and to echo canceller 14. In its easiest-to-implement form canceller 14, as a linear signal processor, is a transversal structure which stores a plurality of elements of the sequence $a_k$ and makes these elements available simultaneously at taps thereon to adjustable tap-gain devices for weighted summation into the desired cancellation signal. The cancellation signal from canceller 14 is combined by subtraction in combiner 16 with the incoming received signal, which includes an echo component originating in source 11 superposed on the [desired] *transmitted* sequence [$b_k$] $b_k$ originating in data source 21. An error-correction loop is completed through receiver 18 (which necessarily includes a quantizing detector) whereby a control signal proportional to the difference between the analog output and quantized digital output $\hat{b}_k$ of data recovery 19 is generated. This control signal is cross-correlated with all the tap outputs of canceller 14 to adjust the gains in a direction to minimize the error.

The same functions and operations are performed at the east terminal in transmitting the data sequence $b_k$ from source 21 to the west terminal and [detecting] *determining* the data sequence $\hat{a}_k$ from the incoming received signal in data recovery east 29.

In the Mueller proposal the formation of the echo cancellation signal depends on the baud timing in the distant transmitter section as reconstructed in the local receiver. Echoes are not properly compensated unless the timing of the incoming signals is closely synchronized with that of the outgoing signals. In my joint copending application an attempt is made to overcome the synchronization problem between two communicating terminals by a slip timing technique in which the echo canceller is jointly controlled by transmitted and received signal timing. The present invention avoids the synchronization problem by independently timing the echo compensation loop at a rate [higher than] *greater than or substantially equal to* twice the highest significant frequency in the transmitted and received signals.

Figure 2:
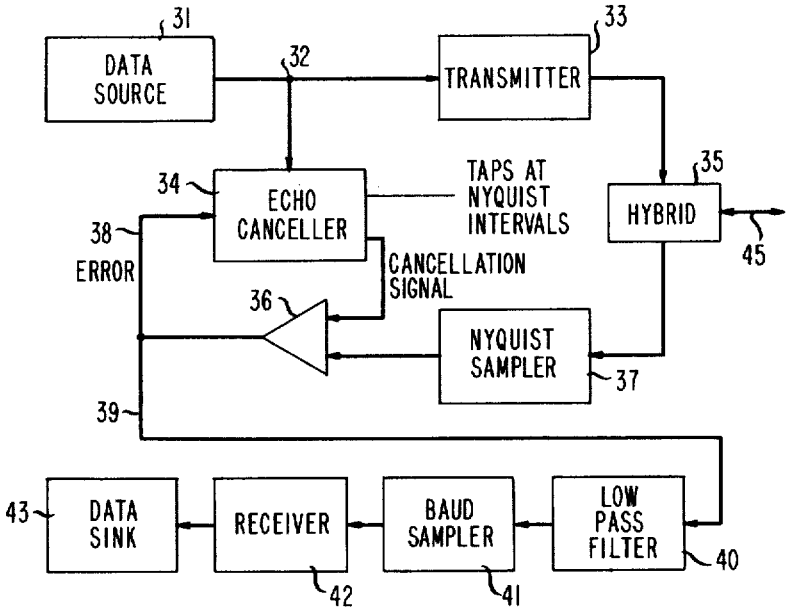
FIG. 2 is a block diagram of an echo canceller for a baseband terminal of a digital data transmission *system* according to this invention.

FIG. 2 represents a single terminal of a baseband data transmission system modified according to this invention to provide an external echo canceller which is timed at a rate greater than or equal to the Nyquist rate, independently of the baud rate of the received signal but an integral multiple of the baud rate of data source 31 and which adapts to an error signal formed from the difference between the received signal sampled at the above-defined timing rate and the echo cancellation signal independently of the detector in the receiver section.

A matching two-way data terminal is assumed to be connected to the other end of two-wire transmission facility 45.

The baseband data terminal of FIG. 2 comprises data source 31, transmitter 33, hybrid network 35, echo canceller 34 having an input from junction 32 between source 31 and transmitter 33, combiner 36, Nyquist sampler 37, low-pass filter 40, baud sampler 41, receiver proper 42 and data sink 43. Assuming totally uncorrelated signals from transmitters at the respective terminals of a two-way data transmission system, the uncancelled echo signal at each receiver section has no correlation with the desired signal from the distant transmitter. Accordingly, when [a simultated] *an* echo cancellation signal is subtracted from the received signal, only the uncancelled echo components in the difference signal [correlated] *correlate* with the local data sequence traversing the echo canceller. These echo components, moreover, can be either near-end components around the hybrid network or far-end components reflected from distant impedance mismatches in the transmission facility, or both.

The elements of the baseband terminal of FIG. 2 are conventional in nature and do not appear to require extensive delineation. Data source 31 can comprise an emitter of baseband digital data at discrete amplitudes during synchronous intervals of time T as measured by an internal timing apparatus or clock not explicitly shown. Transmitter 33 can advantageously comprise a low-pass filter for shaping baseband data pulses into a form, such as the raised-cosine waveform, to match the transmission characteristics of the transmission medium to which hybrid 35 is connected. Hybrid 35 can comprise a differential transformer provided with a balancing network matching as closely as possible the impedance of transmission medium 45 so that leakage of undesired signal energy between transmitting and receiving ports is minimized and transmission of desired signal energy between the two-wire port at transmission medium 45 and the transmitting and receiving ports on the four-wire side is maximized. Echo canceller 34 is advantageously constituted by a transversal filter having controlled tap-gain coefficients. Combiner 36 is functionally a subtractor whose output is the algebraic difference in amplitude between two input quantities. An operational amplifier of the inverting type with resistive feedback suffices for this purpose. Samplers 37 and 41 are effectively normally open switches which are momentarily closed at synchronous instants to allow transmission of an amplitude sample of an input signal therethrough. The synchronous instants can be controlled internally or externally by timing apparatus at the [Nyguist] *Nyquist* rate, i.e., twice the frequency of the highest *significant* frequency in the signal being sampled, or at a baud rate, i.e., the rate at which digital data symbols are being transmitted. Low-pass filter 40 can be a series resistor paired with a shunt capacitor together having a time constant such that frequency components above a certain predetermined cutoff frequency are strongly attenuated relative to frequency components below cutoff. In the present example the cutoff frequency is established above the baud frequency and below the Nyquist frequency. Receiver 42 processes sampled received signals to remove double-frequency components resulting from the sampling process and to produce data bits on discrete levels. Data sink 43 represents utilization apparatus for digital data, such as a tape machine, card punch or a computer.

Echo canceller 34 is preferably a transversal structure with taps spaced no farther apart than the Nyquist interval either on an analog delay line or a shift register advanced at a rate equal to the reciprocal of the chosen tap spacing. Echo canceller 34 takes its signal input from junction 32 at the output of baseband data source 31. Since the highest significant frequency in a voice-band data signal is less than 3200 Hz, an appropriate tap spacing is at the reciprocal of twice this rate or approximately 156 microseconds (1/6400 second) for a typical telephone transmission channel. The highest baud rate that can be sustained in a telephone voiceband channel is currently about 2400. For this rate, the spacing between taps on baud-interval echo cancellers is about 416 microseconds (1/2400 second). Thus, the number of taps in a Nyquist-interval echo canceller, as here described, must [by] *be* increased by a factor of three or four over the number required in a baud-interval echo canceller. The spacing between taps is advantageously chosen such that a baud interval is precisely an integral multiple, represented by the script letter "l", of this spacing.

As shown in FIG. 2, echo canceller 34 stores a dynamic plurality of elements of the outgoing baseband data. At any moment of time the data elements are found at baud intervals on the transversal filter, i.e., at every [th] $l^{th}$ tap. All other taps contain conventional zero samples which do not contribute to the filter output. The non-zero tap voltages are acted on by tap multiplier devices (not shown) and summed to produce samples of an echo cancellation signal at tap-spacing intervals. At the same time the received signal is passed through sampler 37. The two sampled signals are combined in combiner 36 to form an output signal from which most of the echo signal has been cancelled. The residual echo in that part looped back to echo canceller 34 over lead 38 is multiplied by a small factor, called the adaptation step size $\beta$ and that product multiplies the samples of the transmitted data stored at the taps thereon to form correction signals for the tap multiplier devices thereat.

At the same time what appears as uncorrelated noise to echo canceller 34 is largely the sampled received signal which is applied over lead 39 to low-pass filter 40. The latter filter element reconstructs a continuous wave from the sampled signal train appearing on lead 39 and its output is sampled again at the baud rate in baud sampler 41. An alternative interpolation formula can also be applied to derive the desired baud interval samples (with the correct sampling phase) from the sample train on lead 39. Thereafter, receiver 42 detects and reconstitutes the digital data content of the received signal and delivers the recovered data to data sink 43. It is to be understood that receiver 42 can include an adaptive equalizer controlled by a baud-rate error signal in a known manner.

It is to be noted that in the external echo canceller of this invention the adjustment of the tap multiplier devices is adaptively controlled by an error signal consisting of Nyquist-interval samples, while the adjustment of a channel equalizer in the receiver is adaptively controlled by an independent error signal appearing at each baud interval. The result is that the echo energy is substantially removed from the entire frequency spectrum occupied by the reference signal on lead 39. Lack of synchronism between the transmitters in the connected terminals ceases to be a major problem calling for special correction apparatus.

Figure 3:
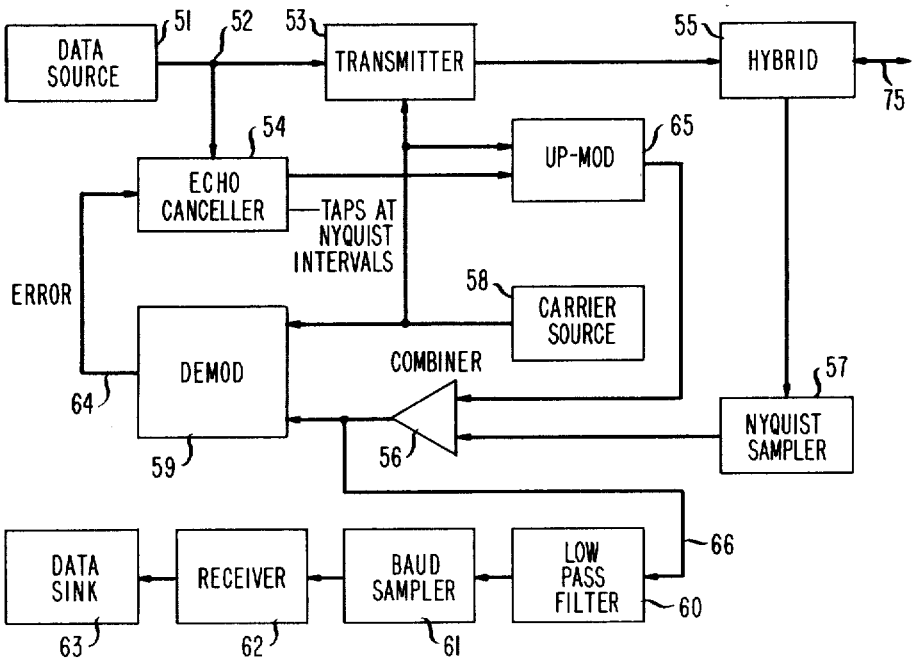
FIG. 3 is a block diagram of an echo canceller for a passband terminal of a digital data transmission system according to this invention.

FIG. 3 is an alternative embodiment for an adaptive external echo canceller constructed according to the principles of this invention. This embodiment is directed to the cancellation of echoes of the transmitted signals where the transmission medium 75 operates in a passband not permitting the transmission of direct current. The data terminal in which this echo canceller is included comprises data source 51, transmitter 53, hybrid network 55, two-wire passband transmission medium 75, echo canceller 54, carrier source 58, upmodulator 65, Nyquist sampler 57, combiner 56, demodulator 59, low-pass filter 60, baud sampler 61, receiver proper 62, and data sink 63. Data source 51 supplies a baseband data sequence at junction 52 to transmitter 53 and to echo canceller 54. Transmitter 53 includes such modulation apparatus as is required to translate the baseband data sequence to the passband of transmission medium 75. Echo canceller 54 is preferably a plurally tapped transversal structure including adjustable gain control devices well known in the art at each tap, tap adjustment circuitry for adjusting the tap weights of the tap multipliers, and a summation circuit from which emerges a baseband echo cancellation signal. The taps on echo canceller 54 are spaced no farther apart than Nyquist intervals in accordance with the principles of this invention.

The elements of the passband terminal of FIG. 3 are also conventional in nature and do not appear to require extensive description. Data source 51 is substantially the same as data source 31 shown in FIG. 2 and emits synchronous digital data at intervals T measured by internal timing apparatus not explicitly shown. Transmitter 53 can advantageously comprise an amplitude modulator in which baseband data are translated to a passband determined by a sinusoidal carrier wave to match the transmission characteristics of the transmission medium to which hybrid 55 is connected. Hybrid 55 is substantially the same as hybrid 35 shown in FIG. 2. Echo canceller 54 is substantially the same as canceller 34 in FIG. 2. Combiner 56 differs from combiner 36 in FIG. 2 only in that its inputs are at passband frequency level. Structurally, combiner 56 can comprise an inverting operational amplifier. Samplers 57 and 61 are substantially the same as samplers 37 and 41 in FIG. 2. Carrier source 58 is a stable sinusoidal wave source, preferably crystal controlled, for providing a frequency level on which data signals are modulated in transmitter 53 to match the characteristics of transmission medium 75. The sinusoidal wave is also usable in demodulating [incoming received passband signals to baseband] in demodulator 59 *the passband signals at the output of combiner 56.* Demodulator 59 responds to the sinusoidal carrier wave from carrier source 58 to recover the original wave modulated onto a carrier wave at the distant data terminal. Upmodulator 65 is an apparatus responsive to a sinusoidal carrier wave from carrier source 58 to translate a baseband echo compensation signal from echo canceller 54 to the passband frequency level of incoming received signals prior to being subtracted from the passband received signal in combiner 56. Low-pass filter 60, baud sampler 61 and data sink 63 are substantially the same structurally as their counterparts 40, 41 and 43 in FIG. 2. Receiver 62 can comprise a demodulator for translating received signals to baseband frequency level. Receiver 62 is assumed to include its own demodulating carrier wave source.

The incoming received signal from transmission medium 75 traverses hybrid network 55 and is sampled at a rate no less than twice the highest *significant* frequency in the received signal as in the baseband embodiment of FIG. 2. The sampled output is in turn applied to one input of combiner 56, which has another input for accepting the echo cancellation signal. Since the echo cancellation signal generated in echo canceller 54 is in the baseband frequency region, it is necessary to translate it to the passband region of the received signal in upmodulator 65, which is under the control of carrier source 58. Carrier source 58 is also used to translate the outgoing transmitted signal to the passband of transmission medium 75.

The output of combiner 56 includes the sampled received signal from transmission medium 75 by way of hybrid network 55 compensated by an echo cancellation signal from echo canceller 54 upmodulated in modulator 65 to the passband region of transmission medium 75. Since the output of combiner 56 is at passband frequency, demodulator 59 under the control of carrier source 58 is provided to translate the compensated received signal, which is an error signal as far as adjustment of the echo canceller is concerned, back to the baseband frequency level. The demodulated error signal is applied to echo canceller 54 on lead 64.

The compensated received signal appearing on lead 66 is exactly analogous to the direct output of combiner 36 in the baseband embodiment of FIG. 2. It follows that low-pass filter 60, baud sampler 61, receiver 62, and data sink 63 are substantial counterparts of elements 40 through 43 in FIG. 2. The compensated received signal is thus conventionally detected to supply digital data to data sink 63.

Figure 4:
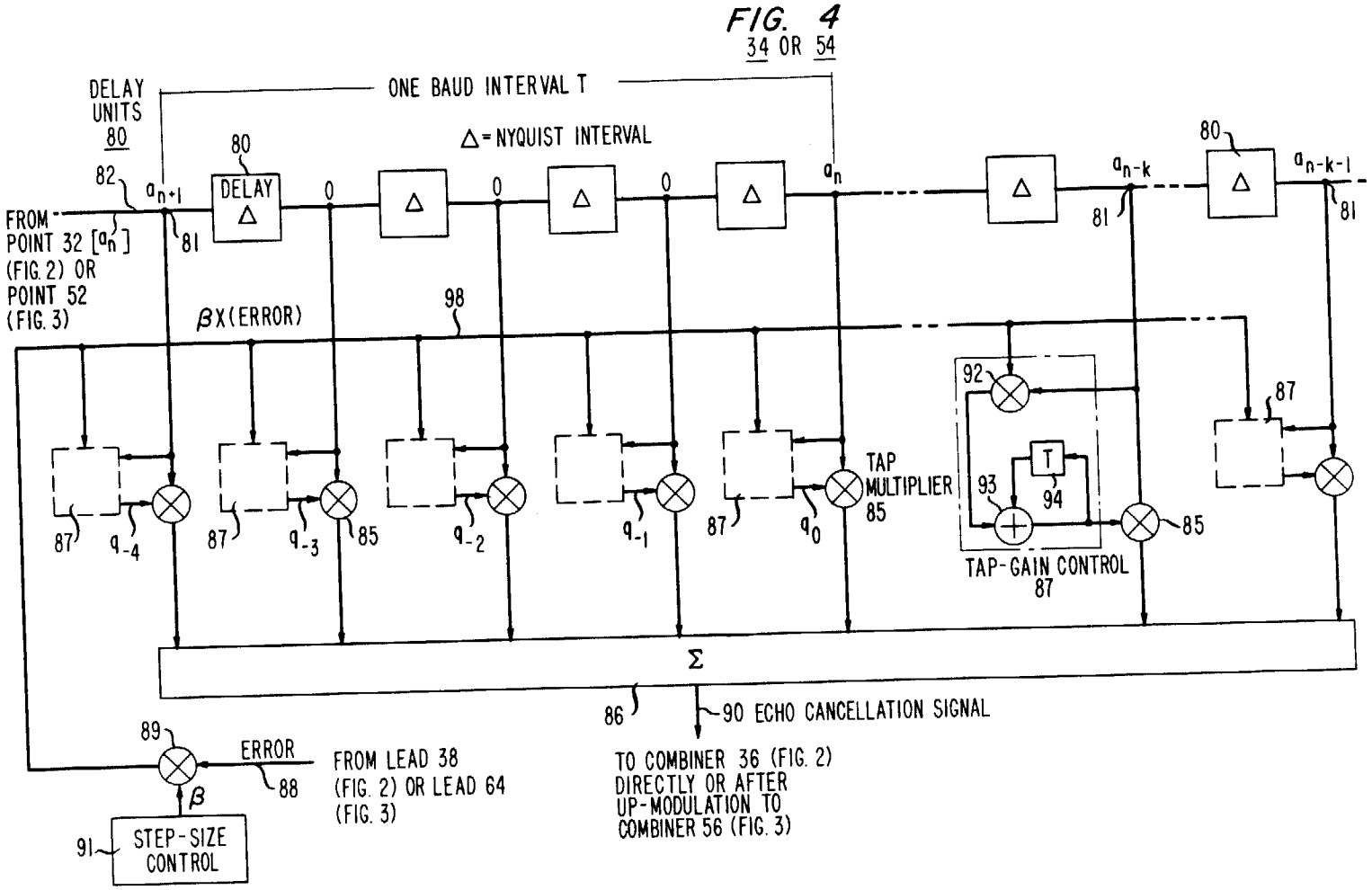
FIG. 4 is a block diagram of a sparsely filled transversal filter useful in the echo canceller of either FIG. 2 or FIG. 3.

FIG. 4 illustrates in simplified block diagrammatic form a sparsely filled transversal filter useful in the practice of this invention, specifically as an implementation of blocks 34 and 54 in respective FIGS. 2 and 3. Structurally, the transversal filter of FIG. 4 is conventional and comprises a plurality of delay units 80 connected in cascade so as to provide signal tapping points 81 at the beginning, intermediate points and end of a composite delay medium; a tap multiplier 85 at each tapping point 81; a tap-gain control unit 87 at each tapping point 81; a summation circuit 86; and an output terminal 90. One baud interval is assumed to span each four consecutive tapping points and successive tapping points are separated by the Nyquist interval $\Delta$ so that the ratio of baud to Nyquist interval is illustratively the integer four, i.e., $l=4$.

[At the input terminal 12] *On input lead 82* a sequence of baud-interval samples of the intended outgoing data sequence $\{a_n\}$ is applied to the delay medium, illustratively a series of analog delay units 80 with individual delay amount $\Delta$. Thus, at any instant of time only every fourth tap contains a non-zero signal sample (as is indicated by the notation $a_{n+1}$, $a_n$, and $a_{n-k}$) and the intermediate taps are unoccupied (as is indicated by the zeroes). Every tap has connected to it tap multiplier 85 and a tap-gain control unit 87. The tap-gain coefficients [$q_n$] $q_{-4}, q_{-3}, q_{-2}$, *etc.* appearing in the output of each tap-gain control unit 87 are derived from the product of a tap sample $a_{n-k}$ and an attenuated error signal on lead 88 by an effective correlation process.

The effective correlation process is carried out in FIG. 4 by first multiplying the error signal generated directly in the output of combiner 36 in FIG. 2 or in the output of combiner 56 in FIG. 3 after demodulation in demodulator 59 by a step-size control factor $\beta$ in multiplier 89 to form an attenuated error signal on lead 98. The factor $\beta$ is preferably less than 1 and is subject to adjustment under the control of step-size control 91. A larger value of $\beta$ may be used to advantage during a training sequence for establishing a connection between data terminals than during message transmission, for example.

Within each gain-control unit 87, as shown in detail at the tap 81 furnishing tap sample $a_{n-k}$, the attenuated error signal on lead 98 is multiplied by the tap sample in multiplier 92, whose output product is applied to a summer 93. The output of summer 93 is fed back to its input through a baud-interval delay unit 94 so that its instantaneous output is incrementally updated every baud interval in the manner of an integrator. The continually updated output of summer 93 is thus the tap-gain coefficient for tap multiplier 85.

Over a plurality of adjustments the overall effect in the tap weight applied by a tap multiplier 85 to a data sample at a tap 81 in FIG. 4 is analogous to what would result from a correlation of the error signal over the same period of time with the data signal. For this reason tap-gain control 87 can be loosely referred to as a correlator. Since the intermediate taps have zero-value samples, no contribution is made to the summed output of summation circuit 86 during each Nyquist interval by the intermediate taps. In this sense the delay medium is sparsely occupied. Nevertheless, the contents of the delay medium are shifted to the right each Nyquist interval by the interval $\Delta$ and a new set of tap-gain coefficients [, $q_n$] act on the non-zero samples of the outgoing baseband data.

By way of example, at the time instant shown in FIG. 4 tap-gain coefficients $q_{-4}$, $q_0$, $q_{+4}$, and so forth are active. In the next Nyquist [intervak] *interval* tap-gain coefficients $q_{-3}$, $q_{+1}$, $q_{+5}$, and so forth are brought into use. Thus, the arrangement of FIG. 4 operates as though there were four differentially delayed delay media acting in parallel on the same input signal sequence. In this way an echo cancellation component is provided each Nyquist interval from baud-interval samples of the outgoing data sequence. As a practical matter the transversal structure can be limited to having taps at baud intervals with a sequence of tap-gain coefficients rotating at Nyquist intervals in a time shared arrangement.

Each multiplier 85 multiplies its associated tap sample [$a_n$] at a tap 81 by a tap coefficient [$q_n$] to form a product [of the form $a_nq_n$]. The summation of these products is taken in summation circuit 86 to form an echo cancellation signal on output terminal 90 [according to the mathematic expression shown in FIG. 4].

Figure 5:
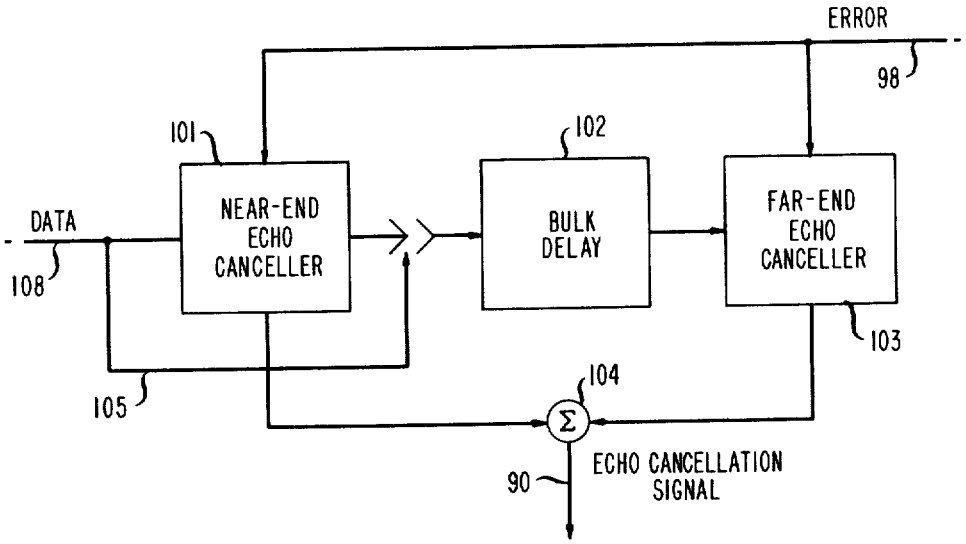
FIG. 5 is a block diagram of an echo canceller with a bulk delay arrangement separating active transversal filter sections treating respective near-end and far-end echo components.

It has been observed that, although the principal echo component appearing in the received signal is due to near-end local loop impedance discontinuities in, and leakage around, the hybrid junction, there also exists a far-end echo component from impedance irregularities at the telephone central office, at interfaces between sections of the transmission path (for example, at junctions between two and four wire links) and from the hybrid junction at the far-end terminal. The near-end and far-end echo groups are each dispersed over a few milliseconds. The magnitude of the dispersal is determinative of the number of taps required on the echo canceller. At the same time the interval between echo groups may be as much as 100 milliseconds on land circuits and up to 1000 milliseconds on satellite circuits. The distant echo although typically about 10 decibels below the near echo is nevertheless strong enough to degrade performance significantly. Rather than have an echo canceller spread over 1000 milliseconds, it is feasible within the principles of this invention to provide separate echo cancellers for each of the near-end and far-end echo groups and insert a bulk delay unit between the local data source and the echo-canceller which is assigned to operate on the distant echo group, or between active echo-canceller sections as shown in FIG. 5. The separate echo cancellation signals are first mixed to form a composite echo cancellation signal before being combined with the sampled received signal.

FIG. 5 shows an advantageous arrangement for generating in a single combined output echo cancelling signals for widely separated near-end and far-end echo components derived from the same transmitted data signal. The combination of a near-end and a far-end canceller comprises a near-end active echo canceller 101, a far-end active echo canceller 103 and a fixed bulk-delay unit 102. The data signal, whose echoes are to be compensated, appears on lead [12] *108* and is applied to near-end canceller 101. This signal after propagating through canceller 101 is further delayed in bulk delay unit 102 before application to far-end canceller 103. Processing of samples of the data signal to be transmitted is identical in cancellers 101 and 103 under the control of an attenuated error signal on lead 98. Each of cancellers 101 and 103 is the same internally as that shown in FIG. 4. The two echo compensating components from cancellers 101 and 103 [occur sequentially in time and] are combined into a single compensation signal in summer 104.

The delay amount provided by bulk [density] *delay* 102 is determined by the length of the transmission path between data terminals. It is obvious that the input to bulk delay 102 can be connected to data lead 12 directly and have the same overall effect, provided only that the bulk delay include that inherent in near-end canceller 101. This alternate connection is shown as lead 105 in FIG. 5.

While this invention has been described in terms of specific illustrative embodiments, it will be understood that [is] *it* is susceptible to modification by those skilled in the art to which it relates within the spirit and scope of the appended claims.

What is claimed is:

1. An echo cancellation arrangement for a baud-synchronous digital data transmission system *comprised of terminals each* having both a transmitter section and a receiver section for simultaneous two-way signaling at full bandwidth over a common signal path, *said echo cancellation arrangement* comprising at each [such] terminal, means for sampling incoming received signals at a rate *greater than or* substantially equal to twice the highest frequency employed in said signal path, an adjustable signal processor for compensating for echoes of signals being transmitted by said transmitter section into said receiver section having an input connected to a data source in said transmitter section and an output combined in subtractive relationship with the output signal from said sampling means to form a subtractive output having an error component, said signal processor storing consecutive discrete-level samples from said data source at baud intervals and shifting such samples through a sequence of storage locations at intervals no greater than the reciprocal of twice the highest frequency employed in said signal path and such that an integral number of such shifting intervals occur in each baud interval, *and* means within said signal processor for computing the product of said consecutive samples with the error component of said subtractive output, and means for [recovering digital data from] *applying* the subtractive output of said signal processor[,-] *to said receiver section.*

2. The arrangement defined in claim 1 in which said adjustable signal processor comprises a synchronously tapped delay medium, an adjustable gain device for each tap on said delay medium, means for entering a discrete-level digital data sample into said delay medium at baud intervals and zero-level samples at intervening times, tap-weight adjustment means for each tap on said delay medium under the control of the error component in said subtractive output, and means for combining tap signals operated on by said adjustable gain devices.

3. The arrangement defined in claim 1 in which said transmission system operates at baseband frequencies between terminals.

4. The arrangement defined in claim 1 in which said transmission system operates at passband frequencies between terminals and the output of said signal processor is upmodulated to said passband frequency region before being subtractively combined with the output of said sampling means and in which the subtractive output of said signal processor is demodulated from said passband frequency region to the baseband region before application to said signal processor.

5. The arrangement defined in claim 1 in which said adjustable signal processor is adapted to the compensation of both near-end and far-end echo components and comprises first and second synchronously tapped delay media, an adjustable gain device for each tap on said first and second delay media, a fixed delay medium comparable in delay to the propagation time differential between near-end and far-end echoes in circuit with said first and second tapped media, means for entering discrete-level digital data samples into said first delay medium at baud intervals and zero-level signals at intervening times for further propagation through said fixed delay medium and said second tapped delay medium in tandem, tap-weight adjustment means for each tap on said first and second media controlled by the error component in said subtractive output, and means for combining tap signals operated on by said tap-weight adjustment means from both of said first and second tapped media.

6. In a two-way data transmission system having a four-wire to two-wire bridge between a common transmission link and each system terminal including separate transmitter and receiver sections, a compensation circuit for transmitter signal components leaking across said bridge between transmitter and receiver sections at each terminal for forming a sampled echo cancellation signal, said compensation circuit storing a plurality of samples of digital data to be transmitted spaced by baud intervals and of zero-order samples at uniform intervening intervals no longer than the reciprocal of twice the highest frequency applied to said transmission link, sampling means for operating on incoming received signals at a rate *greater than or* substantially equal to twice the highest frequency employed on said transmission link to form a high-speed sampled sequence, *and* means for subtracting the sampled echo cancellation signal derived in said compensation circuit from the high-speed sampled sequence derived in said sampling means for forming an output signal substantially free of transmitter signal components for adaptive control of said compensation circuit, and

[recovery] means for [obtaining message data from] *applying* the output of said [substracting] *subtracting* means *to the receiver section of said each terminal.*

7. The two-way transmission system defined in claim [5] *6* further comprising at each terminal thereof, a carrier wave source, a transmitter under the control of said carrier wave source for translating data signals to be transmitted to the passband of said transmission link, an upmodulator under the control of said carrier wave source for elevating the echo-cancellation signal from said compensation circuit to the passband of said transmission system, and a demodulator under the control of said carrier wave source in circuit between said subtracting means and said compensation circuit for translating the output signal from said combining means to the baseband frequency region.

8. In combination with a digital data transmission system including terminals with transmitter and receiver sections for simultaneous two-way transmission at full bandwidth connected through a hybrid network to a common transmission channel comprising at each terminal a data signal source in the transmitter section, an adjustable echo canceller having an input connected to said data signal source for an outgoing signal from the transmitter section, delay line taps spaced no further apart than the reciprocal of twice the highest frequency employed on said transmission channel and a summation circuit for selectively weighted signals on said taps for forming an echo cancellation signal, means for sampling incoming received signals at substantially *or greater than* twice the highest [usable] *significant* frequency on said common transmission channel to form a received digital sequence, means for subtractively combining said echo cancellation signal with said received digital sequence to form a compensated received signal, *and* means for applying said compensated received signal to said echo canceller for multiplication with outgoing digital data samples at the taps thereon for controlling the selective weighting of digital data samples at said taps, and means for [recovering message data from] *applying* said compensated received signal *to the receiver section of said each terminal.*

9. The combination set forth in claim 8 in which said transmission channel operates in a baseband frequency region.

10. The combination set forth in claim 8 in which said transmission channel operates in a passband frequency region and said echo cancellation signal is upmodulated to passband before application to said combining means and said compensated received signal is demodulated to baseband before application to said echo canceller.

*11. The arrangement defined in claims, 1, 2, 3, 4 or 5 wherein said receiver section comprises means for recovering digital data from the subtractive output of said signal processor.*

*12. The two-way transmission system defined in claims 6 or 7 wherein said receiver section of said each terminal comprises recovery means for obtaining message data from said output of said subtracting means.*

*13. The combination set forth in claims 8, 9 or 10 wherein said receiver section of said each terminal comprises means for recovering message data from said compensated received signal.*

*14. An arrangement for use in conjunction with data communications circuitry which accepts near-end baseband data having a predetermined baud rate, transmits signals representing said baseband data, and receives signals which include echoes of said transmitted signals, said arrangement comprising,*

*means for forming a succession of samples of said received signals at a rate which is greater than or substantially equal to twice the highest significant frequency in said received signals and which is l times greater than said baud rate, l being a predetermined number,*

*means for storing l sets of coefficients,*

*means for forming a succession of echo cancellation samples and for combining each echo cancellation sample with a respective one of said received signal samples to form a succession of compensated samples, each one of l successive echo cancellation samples being equal to the sum of the products of (a) the coefficients of a different one of the l coefficient sets with (b) respective signals each derived from a respective one of a plurality of elements of said baseband data associated with said l samples, and*

*means for repetitively updating the values of said coefficients in response to at least ones of said compensated samples such that the energy in said compensated samples originating from said echoes is minimized.*

*15. An arrangement for use in conjunction with circuitry which transmits signals in response to near-end baseband data and which receives signals which include echoes of the transmitted signals, said arrangement comprising*

*means for forming a plurality of samples of the received signals at greater than or substantially the Nyquist rate, said samples having respective components resulting from said echoes,*

*means for forming a plurality of samples of an echo cancellation signal, the value of each one of l successive ones of said cancellation signal samples being a function of (a) a plurality of elements of said baseband data associated with said l samples and (b) a predetermined one of l sets of coefficients, l being a predetermined number, and*

*means for combining each cancellation signal sample with a respective one of said received signal samples to form a plurality of compensated samples, the values of said coefficients being such that said compensated samples are substantially free of said echo components.*

*16. A method for use in conjunction with circuitry which transmits signals in response to near-end baseband data and which receives signals which include echoes of the transmitted signals, said method comprising the steps of*

*forming a plurality of samples of the received signals at greater than or substantially the Nyquist rate, said samples having respective components resulting from said echoes,*

*forming a plurality of samples of an echo cancellation signal, the value of each one of l successive ones of said cancellation signal samples being a function of (a) a plurality of elements of said baseband data associated*

*with said l samples and (b) a predetermined one of l sets of coefficients, l being a predetermined number, and*

*combining each cancellation signal sample with a respective one of said received signal samples to form a plurality of compensated samples, the values of said coefficients being such that said compensated samples are substantially free of said echo components.*

*17. An arrangement for use in conjunction with circuitry which transmits signals in response to near-end baseband data and which receives signals which include echoes of the transmitted signals, said arrangement comprising*

*means for forming a plurality of samples of the received signal at greater than or substantially the Nyquist rate, said samples having respective components resulting from said echoes,*

*signal processing means for forming a plurality of samples of a cancellation signal, said signal processing means including means for storing l sets of coefficients and means for forming as each one of l successive cancellation signal samples the sum of the products of (a) the coefficients of a different one of the coefficient sets with (b) respective signals each derived from a respective one of a plurality of elements of said baseband data associated with said l cancellation signal samples, l being a predetermined number, and*

*means for combining each cancellation signal sample with a respective one of said received signal samples to form a plurality of compensated samples, the magnitude of each cancellation signal sample being substantially equal to the magnitude of the echo component of the respective received signal sample.*

*18. The invention of claim 17 wherein said signal processing means further includes means for updating the values of at least individual ones of said coefficients such that over time, the difference between the magnitude of each cancellation signal sample and the magnitude of the echo component of the respective received signal sample is minimized.*

*19. The invention of claim 18 wherein said updating means includes means for combining with the values of said individual ones of said coefficients respective updating terms, each updating term being a function of a respective one of said compensated samples.*

*20. The invention of claim 18 wherein said updating means includes means for combining with the values of said individual ones of said coefficients respective successions of updating terms, each updating term being a function of (a) a respective compensated sample and (b) the signal with which the coefficient being updated was multiplied in the formation of said respective compensated sample.*

*21. The invention of claim 18 wherein said received signals represent far-end data and wherein said arrangement further comprises means for processing said compensated samples to recover said far-end data therefrom.*

*22. The invention of claims 14 or 17 wherein said received signals represent far end data and wherein said arrangement further comprises means for recovering said far-end data from said compensated samples.*

*23. A method for use in conjunction with data communications circuitry which accepts near-end baseband data having a predetermined baud rate, transmits signals representing said baseband data, and receives signals which include echoes of said transmitted signals, said method comprising the steps of*

*forming a succession of samples of said received signals at a rate which is greater than or substantially equal to twice the highest significant frequency in said received signals and which is l times greater than said baud rate, l being a predetermined number,*

*forming a succession of echo cancellation samples*

*combining each echo cancellation sample with a respective one of said received signal samples to form a succession of compensated samples, each one of l successive echo cancellation samples being equal to the sum of the products of (a) the coefficients of a different one of l sets of coefficients with (b) respective signals each derived from a respective one of a plurality of elements of said baseband data associated with said l samples, and*

*repetitively updating the values of said coefficients in response to at least ones of said compensated samples in such a way as to minimize the energy in said compensated samples originating from said echoes.*

*24. A method for use in an arrangement which transmits signals in response to near-end baseband data and which receives signals which include echoes of the transmitted signals, said method comprising the steps of*

*forming a plurality of samples of the received signals at greater than or substantially the Nyquist rate, said samples having respective components resulting from said echoes,*

*forming a plurality of samples of a cancellation signal including the step of forming as each one of l successive cancellation signal samples the sum of the products of (a) the coefficients of a different one of l sets of coefficients with (b) respective signals each derived from a respective one of a plurality of elements of said baseband data associated with said l cancellation signal samples, l being a predetermined number, and*

*combining each cancellation signal sample with a respective one of said received signal samples to form a plurality of compensated samples, the magnitude of each cancellation signal sample being substantially equal to the magnitude of the echo component of the respective received signal sample.*

*25. The invention of claim 24 wherein said cancellation signal forming step includes the further step of updating the values of at least individual ones of said coefficients such that over time, the difference between the magnitude of each cancellation signal sample and the magnitude of the echo component of the respective received signal sample is minimized.*

*26. The invention of claim 25 wherein said updating step includes the step of combining with the values of said individual ones of said coefficients respective updating terms, each updating term being a function of a respective one of said compensated samples.*

*27. The invention of claim 25 wherein said updating step includes the step of combining with the values of said individual ones of said coefficients respective successions of updating terms, each updating term being a function of (a) a respective compensated sample and (b) the signal with which the coefficient being updated was multiplied in the formation of said respective compensated sample.*

*28. The invention of claim 25 wherein said received signals represent far-end data and wherein said method comprises the further step of processing said compensated samples to recover said far-end data therefrom.*

*29. The invention of claims 23 or 24 wherein said received signals represent far end data and wherein said method comprises the further step of recovering said far-end data from said compensated samples.*

* * * * *